United States Patent
Kamada

(10) Patent No.: US 10,514,874 B1
(45) Date of Patent: Dec. 24, 2019

(54) SHEET REMOVAL DETERMINATION SYSTEM AND SHEET REMOVAL DETERMINATION METHOD

(71) Applicant: TOSHIBA TEC KABUSHIKI KAISHA, Shinagawa-ku, Tokyo (JP)

(72) Inventor: Jin Kamada, Izunokuni (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/032,187

(22) Filed: Jul. 11, 2018

(51) Int. Cl.
*G06F 3/12* (2006.01)
*G06K 15/02* (2006.01)
*B65H 43/02* (2006.01)

(52) U.S. Cl.
CPC ........... *G06F 3/1259* (2013.01); *B65H 43/02* (2013.01); *G06F 3/1207* (2013.01); *G06F 3/1222* (2013.01); *G06F 3/1231* (2013.01); *G06F 3/1238* (2013.01); *G06F 3/1256* (2013.01); *G06F 3/1257* (2013.01); *G06F 3/1293* (2013.01); *G06F 3/1296* (2013.01); *G06K 15/02* (2013.01); *B65H 2511/515* (2013.01)

(58) Field of Classification Search
CPC .... G06F 3/1259; G06F 3/1256; G06F 3/1222; G06F 3/1293; G06F 3/1296; G06F 3/1257; G06F 3/1231; G06F 3/1207; G06F 3/1238; B65H 43/02; B65H 2611/515; G06K 15/02

USPC ........................................................ 358/1.15
See application file for complete search history.

(56) References Cited

U.S. PATENT DOCUMENTS

| | | | | |
|---|---|---|---|---|
| 2008/0170256 | A1* | 7/2008 | Matsuhara | G06F 3/1207 358/1.15 |
| 2012/0250059 | A1* | 10/2012 | Itogawa | G06F 3/1204 358/1.13 |
| 2015/0286447 | A1* | 10/2015 | Thijssen | G03G 15/6552 358/1.12 |
| 2018/0284678 | A1* | 10/2018 | Miyamoto | B41J 29/00 |

FOREIGN PATENT DOCUMENTS

| | | |
|---|---|---|
| JP | 2004-352429 | 12/2004 |
| JP | 2015-220472 | 12/2015 |

\* cited by examiner

*Primary Examiner* — Saeid Ebrahimi Dehkordy
(74) *Attorney, Agent, or Firm* — Amin, Turocy & Watson LLP

(57) ABSTRACT

In accordance with an embodiment, a sheet taking away determination system comprises a first detection device configured to detect a sheet discharged to a discharge port; a second detection device configured to detect a terminal device positioned within a communication enabled range of the second detection device; and a controller configured to determine that the sheet is taken away if the second detection device detects the terminal device and a quantity of the sheets is less than that of the sheets before detection after the sheet is detected by the first detection device.

20 Claims, 9 Drawing Sheets

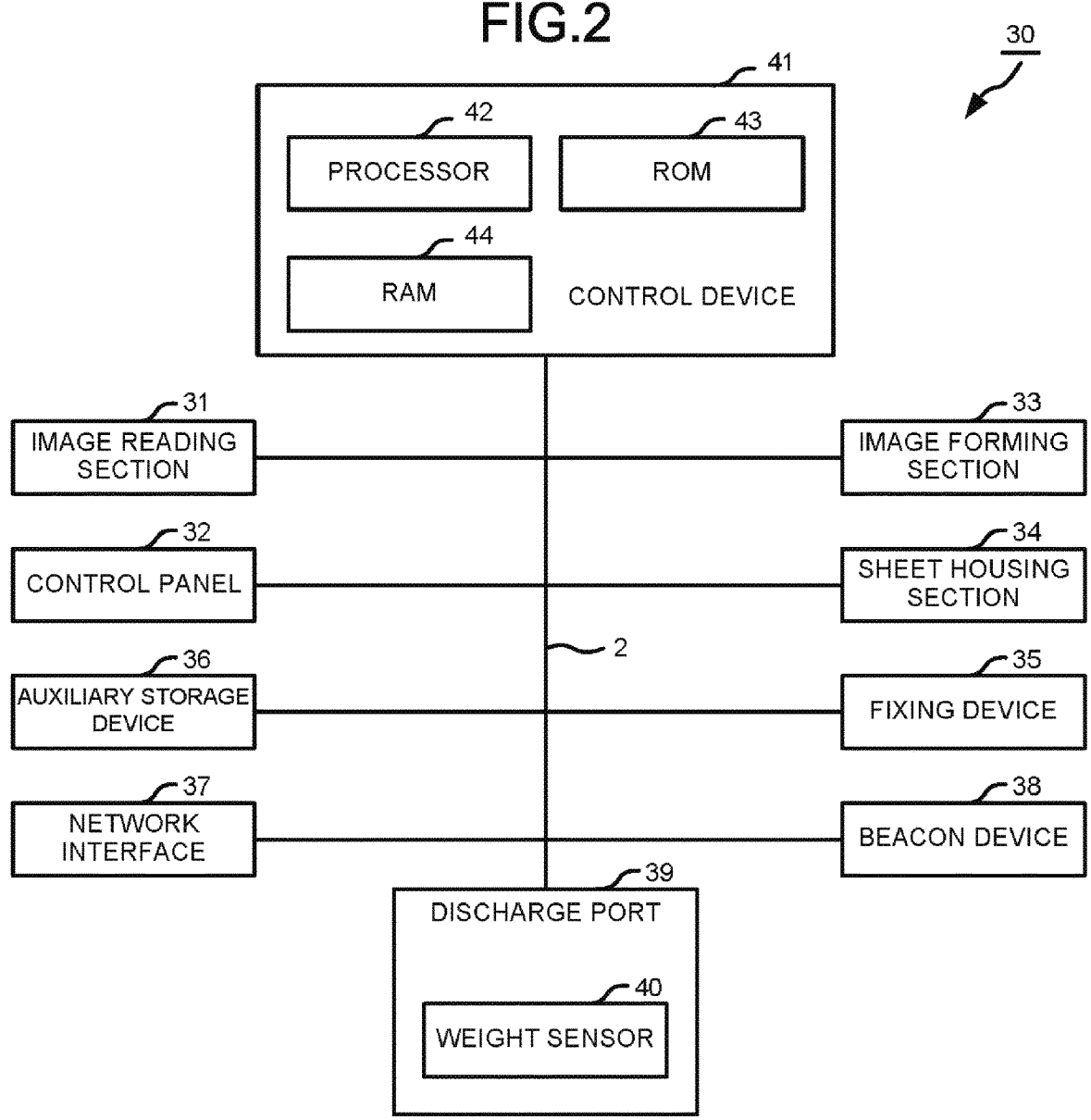

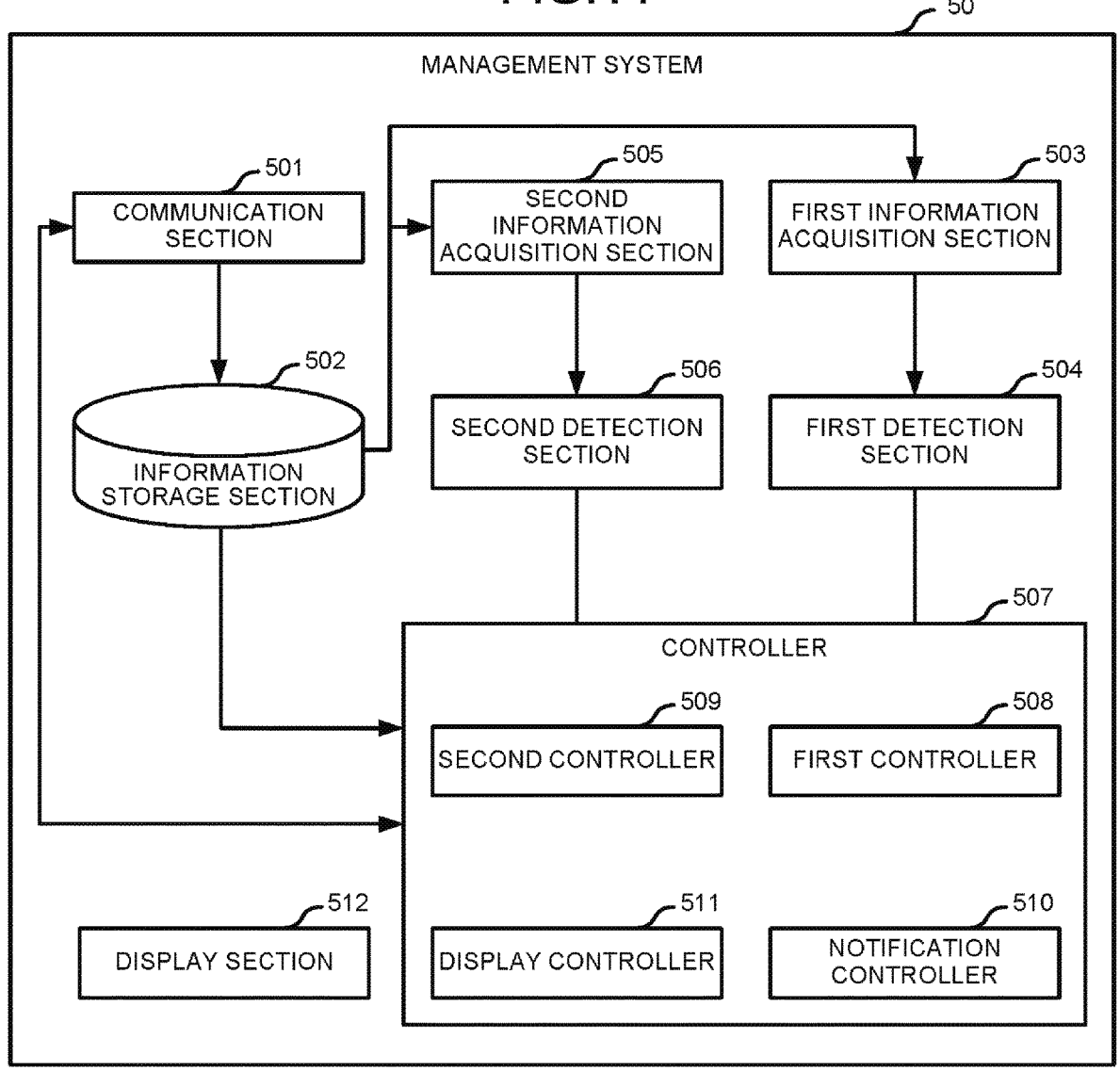

SHEET REMOVAL DETERMINATION SYSTEM AND SHEET REMOVAL DETERMINATION METHOD

FIELD

Embodiments described herein relate generally to a sheet removal determination system and a sheet removal determination method.

BACKGROUND

Conventionally, a current printer has a structure for preventing a sheet discharge from an image forming apparatus to be placed at a discharge port. In the current printer, a print job is stored in the image forming apparatus via a printing server. Then, the image forming apparatus executes the stored print job on condition that a user is authenticated.

However, in a conventional method, there is a case in which whether the discharged sheet is removed or taken away cannot be determined.

DESCRIPTION OF THE DRAWINGS

FIG. 2 is a block diagram illustrating a hardware configuration of an image forming apparatus;

FIG. 3 is a diagram illustrating a concrete example of a job data table;

FIG. 11 is a schematic block diagram illustrating functional components of a management system; and FIG. 12 is a diagram illustrating a concrete example of a condition table.

DETAILED DESCRIPTION

In accordance with an embodiment, a sheet removal or taking away determination system comprises a first detection device configured to detect a sheet discharged to a discharge port; a second detection device configured to detect a terminal device positioned within a communication enabled range of the second detection device; and a controller configured to determine that the sheet is taken away if the second detection device detects the terminal device and a quantity of the sheets is less than that of the sheets before detection after the sheet is detected by the first detection device.

Hereinafter, a sheet removal determination system and a sheet removal determination method of an embodiment will be described with reference to the accompanying drawings.

First Embodiment

Figure 1:
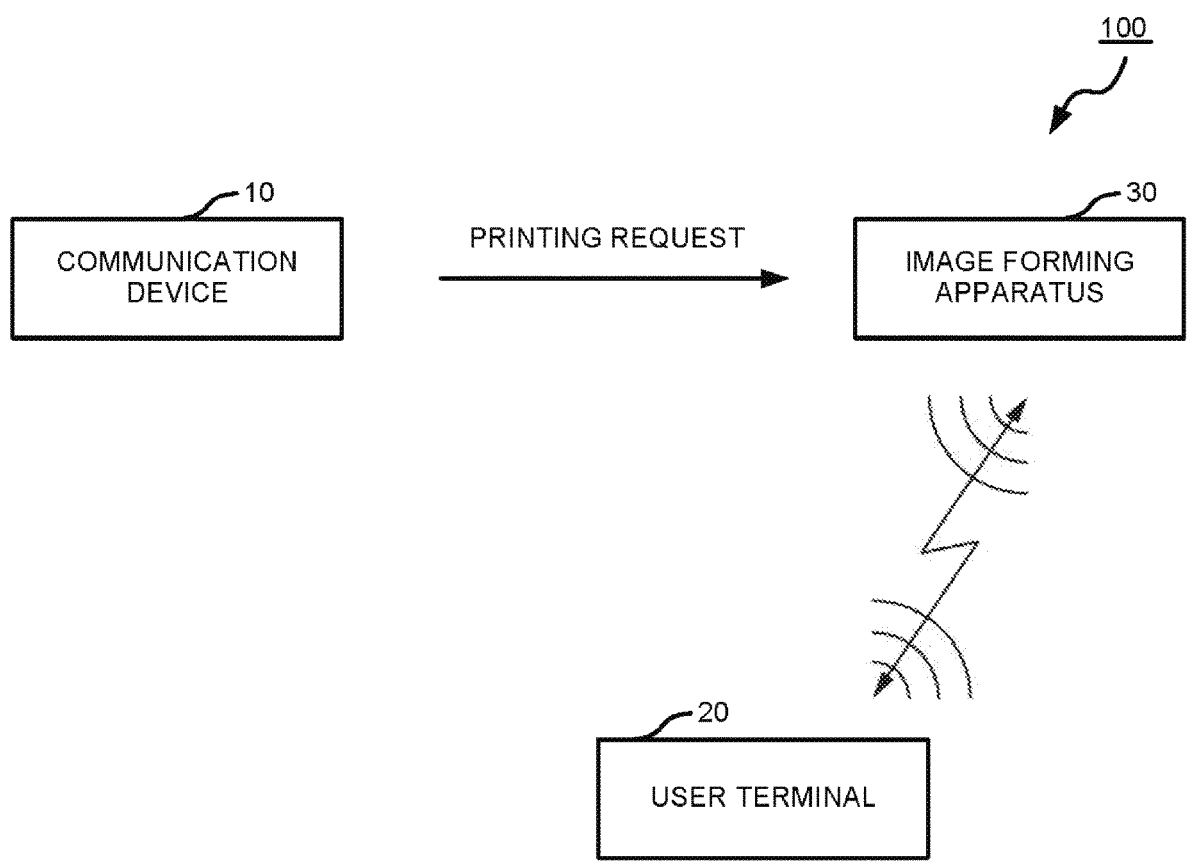
FIG. 1 is a diagram illustrating a system configuration of a neglect prevention system according to a first embodiment.

FIG. 1 is a diagram illustrating a system configuration of a neglect prevention system 100 according to the first embodiment. The neglect prevention system 100 comprises a communication device 10, a user terminal 20 and an image forming apparatus 30.

The communication device 10 sends a printing request to the image forming apparatus 30 in response to an operation by a user. The printing request refers to a request to instruct the image forming apparatus 30 to perform printing. The printing request includes a printing execution instruction, or a printing execution instruction and a keyword used for user authentication. It is preferable that the keyword is a value different for each user. The communication device 10 is an information processing device such as a personal computer.

The user terminal 20 is a terminal device possessed by the user. The user terminal 20 is, for example, a smartphone or a tablet terminal. The user terminal 20 conforms to BLE (Bluetooth® Technology Low Energy) standard, and can perform communication by Bluetooth.

The image forming apparatus 30 is a Multi-function Peripheral (MFP). The image forming apparatus 30 executes an image forming process. The image forming process is a process of forming an image on a sheet. The sheet is, for example, a document, a paper on which characters and images are recorded, or the like. The sheet may be any image receiving medium as long as it can be read by the image forming apparatus 30. The image forming apparatus 30 reads an image formed on the sheet and generates digital data to generate an image file. The image forming apparatus 30 is provided with a weight sensor for detecting weight of the discharged sheet below the sheet discharge port. The image forming apparatus 30 determines the discharge of the sheet and the taking away of the sheet based on information relating to the weight of the sheet detected by the weight sensor.

FIG. 2 is a block diagram illustrating a hardware configuration of the image forming apparatus 30.

The image forming apparatus 30 includes an image reading section 31, a control panel 32, an image forming section 33, a sheet housing section 34, a fixing device 35, an auxiliary storage device 36, a network interface 37, a beacon device 38, a discharge port 39, a weight sensor 40, and a control device 41. Each functional section is connected to be capable of performing data communication via a system bus 2.

The image reading section 31 reads an image of a reading object as intensity of light. For example, the image reading section 31 reads an image to be printed on a sheet on the reading object set on a document reading table. The image reading section 31 records the read image data. The recorded image data may be transmitted to another information processing apparatus via the network. The recorded image data may be used to form an image on the sheet by the image forming section 33.

The control panel 32 includes a display section and an operation section. The display section is a display device such as a liquid crystal display or an organic EL (Electro Luminescence) display. The display section displays various information relating to the image forming apparatus 30 under the control of the control device 41. The operation section includes a plurality of buttons and the like. The operation section receives an operation by the user. The operation section outputs a signal in response to the operation performed by the user to the control device 41. The display section and the operation section may be integrally configured as a touch panel.

The image forming section 33 executes an image forming process. In the image forming process, the image forming section 30 forms an image on the sheet based on the image data generated by the image reading section 10 or the image data received via a communication path.

The sheet housing section 34 is provided with one or a plurality of sheet feed cassettes. The sheet feed cassette accommodates a sheet of a predetermined size and a predetermined type. The sheet feed cassette includes a pickup roller. The pickup roller picks up the sheets one by one from the sheet feed cassette. The pickup roller supplies the sheet taken out to a conveyance path.

The fixing device 35 fixes a toner image on the sheet by applying heat and pressure to the sheet.

For example, the auxiliary storage device 36 is a hard disk or a SSD (Solid State Drive), and stores various data. For example, various data include a job data table, digital data, a job, a job log, and the like. The job data table is a table in which information relating to a print job is associated.

FIG. 3 is a diagram illustrating a concrete example of the job data table. The job data table has a plurality of records indicating information relating to the print job. The record has values of a job ID, a keyword, user information, weight information and a flag. The value of the job ID is identification information for identifying a job to be executed in the image forming apparatus 30. The value of the keyword is a value such as a sign, a character, a symbol or the like used for user authentication. The value of the keyword is not registered when information relating to the keyword is not contained in the printing request. The value of the user information is identification information for identifying a user who inputs the job to the image forming apparatus 30. The user information may be, for example, a name of the user, or identification information for identifying the communication device 10 transmitting the printing request. The value of the weight information is information relating to weight of the sheet output onto a discharge port 39. Items of the weight information include an item "1", an item "2", and items " . . . ". In the item "1", a value indicated by the weight information initially acquired from the weight sensor 40 after the print job is performed is registered. In the items "2" and " . . . ", after the weight information is first acquired from the weight sensor 40, values indicated by the weight information acquired from the weight sensor 40 are registered. The value of the flag indicates whether or not the sheet is improperly taken away. If a condition indicating that the sheet is improperly taken away is satisfied, "1" is registered in the item of the flag. If the condition indicating that the sheet is improperly taken away is not satisfied, "0" is registered in the item of the flag.

Returning again to FIG. 2, and the description of the image forming apparatus 30 is continued.

The network interface 37 transmits and receives data to and from another device. Here, another device is an information processing device such as a personal computer, for example. The network interface 37 operates as an input interface to receive data or an instruction transmitted from another device. An instruction transmitted from another device is an instruction to execute printing. The network interface 37 operates as an output interface to transmit data to another device.

The beacon device 38 transmits beacon signals at predetermined intervals. The beacon device 38 conforms to the BLE standard. The beacon device 38 receives the beacon signal transmitted from the user terminal 20.

The discharge port 39 receives the discharged sheet.

The weight sensor 40 detects the sheet discharged to the discharge port 39. Specifically, the weight sensor 40 detects the weight of the sheet on the discharge port 39. For example, the weight sensor 40 is installed below the discharge port 39. The weight sensor 40 outputs weight information relating to the detected weight to the control device 41. The weight sensor 40 is an example of a first detection device.

The control device 41 includes a processor 42, a ROM (Read Only Memory) 43, and a RAM (Random Access Memory) 44. For example, the processor 42 is a CPU (Central Processing Unit). The processor 42 controls the operation of each functional section of the image forming apparatus 30. The processor 42 executes various processes by copying or decompressing programs stored in the ROM 43 on the RAM 44 and executing them. The ROM 43 stores a program for operating the processor 42. The RAM 44 temporarily stores data used by each functional section of the image forming apparatus 30. The RAM 44 may store digital data generated by the image reading section 31. The RAM 44 may temporarily store the job data table, the job and the job log.

Figure 4:
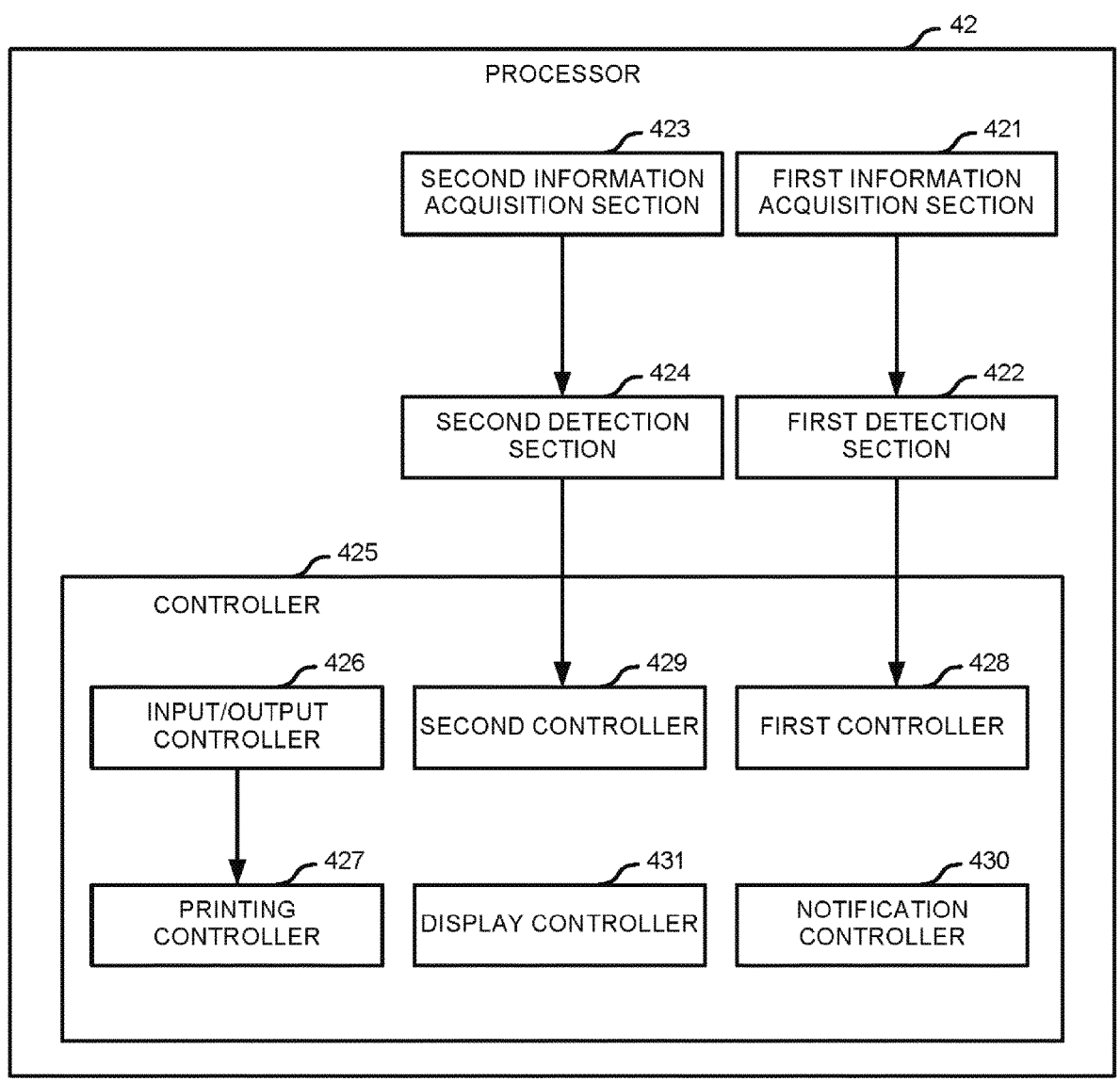
FIG. 4 is a schematic block diagram illustrating functional component of a processor according to the first embodiment.

FIG. 4 is a schematic block diagram illustrating functional components of the processor 42 according to the first embodiment. The processor 42 includes a first information acquisition section 421, a first detection section 422, a second information acquisition section 423, a second detection section 424 and a controller 425. The first information acquisition section 421 acquires the weight information indicating the weight of the sheet detected by the weight sensor 40.

The first detection section 422 detects the presence or absence of the sheet based on the weight information acquired by the first information acquisition section 421.

The second information acquisition section 423 acquires a beacon signal received by the beacon device 38.

The second detection section 424 detects the user terminal based on the beacon signal acquired by the second information acquisition section 423.

The controller 425 includes an input/output controller 426, a printing controller 427, a first controller 428, a second controller 429, a notification controller 430, and a display controller 431.

The input/output controller 426 controls input and output of the data. For example, the input/output controller 426 acquires the printing request sent from the communication device 10 via the network interface 37. The input/output controller 426 registers information in the job data table based on the acquired printing request.

In response to the printing request acquired by the input/output controller 426, the printing controller 427 controls the image forming section 33 and the fixing device 35 to execute the printing.

The first controller 428 executes a taking away determination process based on the detection result of the first detection section 422.

The second controller 429 executes a user detection determination process based on the detection result of the second detection section 424.

The notification controller 430 notifies an authorized user and administrator of the abnormality when the sheet is neglected or the sheet is improperly taken away. The authorized user refers to a user who performs the printing request or a user who gets permission to take away the sheet from the user who performs the printing request. The notification is made by a method of blinking a lamp provided on the image forming apparatus 30, displaying a message, issuing beep sound, or the like.

The display controller 431 controls the display of the control panel 32. For example, the display controller 431 controls the display of the control panel 32 under the control of the notification controller 430 to display a message.

Figure 5:
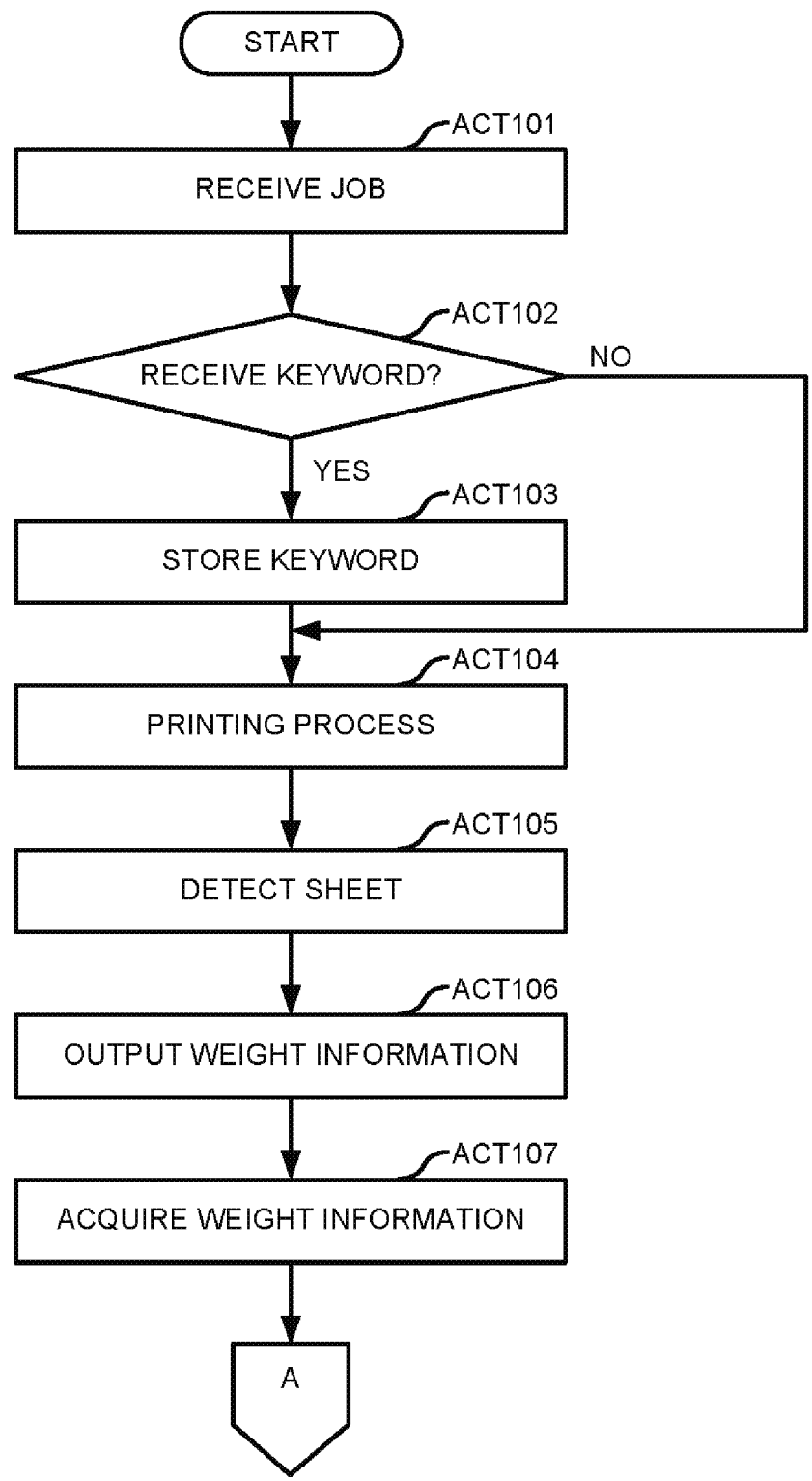
FIG. 5 is a flowchart for depicting a flow of a process by the image forming apparatus.
Figure 6:
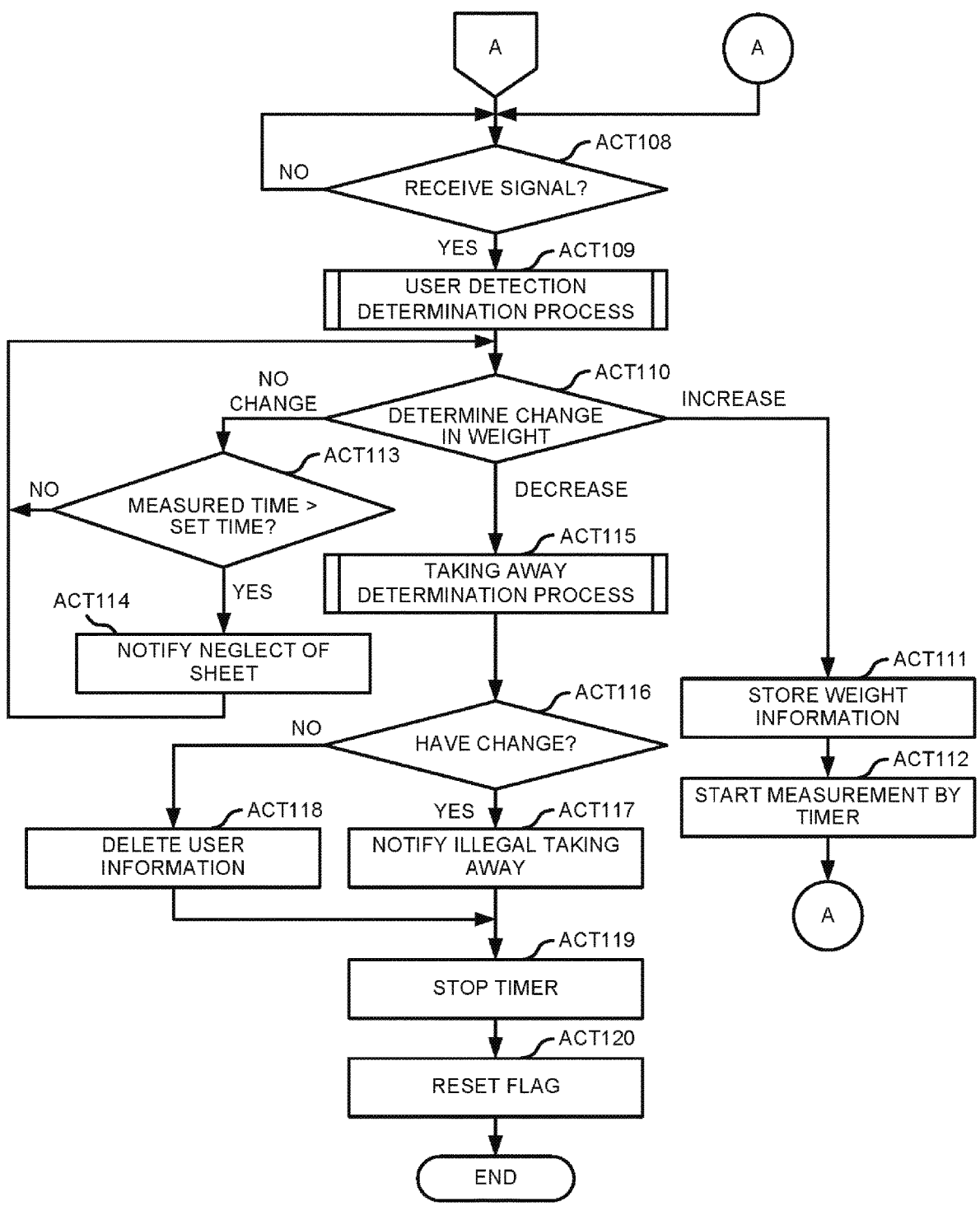
FIG. 6 is a flowchart for depicting a flow of process by the image forming apparatus.

FIG. 5 and FIG. 6 are flowcharts for depicting flows of a process by the image forming apparatus 30.

The input/output controller 426 receives an input of a job indicating the printing request from the communication device 10 (ACT 101). The input/output controller 426 determines whether or not the keyword is received (ACT 102). Specifically, the input/output controller 426 determines whether or not the keyword is received together with the printing request. If the keyword is contained in the printing request, the input/output controller 426 determines that the keyword is received. On the other hand, if the keyword is not contained in the printing request, the input/output controller 426 determines that the keyword is not received.

If the keyword is received (Yes in ACT 102), the input/output controller 426 stores the received keyword and user information in the job data table in association with the identification information of the job (ACT 103). Thereafter, the image forming apparatus 30 performs the printing process according to the input job (ACT 104). By the process in ACT 104, the printed sheet is discharged to the discharge port 39.

The weight sensor 40 detects that the sheet is discharged to the discharge port 39 (ACT 105). The weight sensor 40 acquires the weight information at a time point when the sheet is detected. The weight sensor 40 outputs the acquired weight information to the control device 41 (ACT 106). The first information acquisition section 421 of the control device 41 acquires the weight information output from the weight sensor 40 (ACT 107). The first information acquisition section 421 outputs the acquired weight information to the first detection section 422. The first detection section 422 detects that the sheet is discharged to the discharge port 39 by acquiring the weight information from the first information acquisition section 421. The first detection section 422 outputs the weight information to the second controller 429. The second controller 429 registers the acquired weight information in the job data table in association with the identification information of the job.

The second information acquisition section 423 determines whether or not the beacon signal is received by the beacon device 38 (ACT 108). Specifically, the second information acquisition section 423 determines that the beacon signal is received when the beacon signal is acquired from the beacon device 38. On the other hand, the second information acquisition section 423 determines that the beacon signal is not received when the beacon signal is not acquired from the beacon device 38. If the beacon signal is not received (No in ACT 108), the image forming apparatus 30 stands by until the beacon signal is received.

On the other hand, if the beacon signal is received (Yes in ACT 108), the second controller 429 executes the user detection determination process (ACT 109). The specific process of the user detection determination process is described later. After execution of the user detection determination process, the controller 425 determines a change in the weight (ACT 110). Specifically, the controller 425 compares the weight information acquired by the first information acquisition section 421 with the weight information registered in the job data table to determine the presence or absence of the change in weight.

If the weight indicated by the weight information acquired from the first information acquisition section 421 is heavier than that indicated by the registered weight information, the controller 425 determines that the weight is increasing. If the weight indicated by the weight information acquired by the first information acquisition section 421 is lighter than that indicated by the registered weight information, the controller 425 determines that the weight is decreasing. If the weight indicated by the weight information acquired by the first information acquisition section 421 is the same as that indicated by the registered weight information, the controller 425 determines that there is no change.

If the weight is increasing (ACT 110: increase), the input/output controller 426 stores the weight information in the job data table (ACT 111). Thereafter, the input/output controller 426 starts measuring time with a timer (not shown) (ACT 112). Thereafter, the image forming apparatus 30 executes processes subsequent to the process in ACT 108.

If there is no change (ACT 110: no change), the controller 425 determines whether or not the measured time by the timer exceeds a set time set in advance (ACT 113). The set time is set as a time for allowing neglect of the sheet. The set time may set to the same value for each user or different values. If the measured time does not exceed the set time (No in ACT 113), the image forming apparatus 30 executes the processes subsequent to the process in ACT 110.

On the other hand, if the measured time exceeds the set time (Yes in ACT 113), the notification controller 430 notifies the user who performs the printing or preset administrator of the neglect of the sheet (ACT 114). Thereafter, the image forming apparatus 30 executes the processes subsequent to the process in ACT 110.

If the weight is decreasing (ACT 110: decrease), the first controller 428 performs the taking away determination process (ACT 115). The specific process of the taking away determination process is described later. After executing the taking away determination process, the controller 425 determines whether or not there is an abnormality in the determination result of the taking away determination process (ACT 116). Specifically, the controller 425 determines that there is the abnormality in the determination result when the flag is "1". The controller 425 determines that there is no abnormality in the determination result when the flag is "0".

If there is the abnormality (Yes in ACT 116), the notification controller 430 notifies the user who performs the printing or the preset administrator that the sheet is improperly taken away (ACT 117).

On the other hand, if there is no abnormality (No in ACT 116), the controller 425 deletes a record including the corresponding user information from the job data table (ACT 118).

After process in ACT 117 or ACT 118, the input/output controller 426 stops the time measurement by the timer (ACT 119). Thereafter, the input/output controller 426 resets the flag (ACT 120). Specifically, the input/output controller 426 changes the flag to "0" when the value of the flag is "1", and maintains "0" for the flag when the value of the flag is "0".

Figure 7:
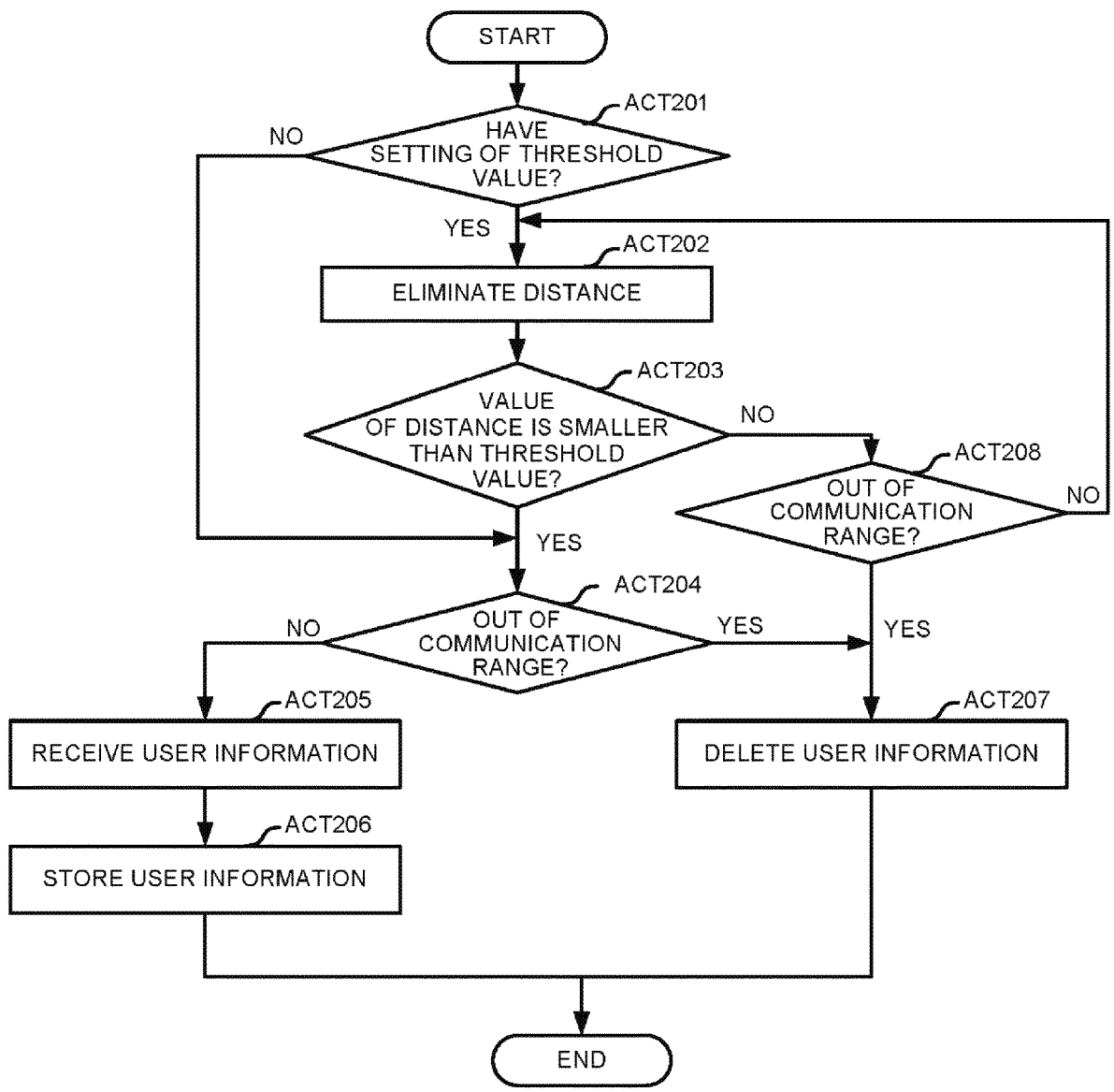
FIG. 7 is a flowchart for depicting a flow of a user detection determination process.

FIG. 7 is a flowchart for depicting a flow of the user detection determination process.

The second controller 429 determines whether or not a threshold value is set in the beacon device 38 (ACT 201). If the threshold value is set (Yes in ACT 201), the second controller 429 estimates a distance between the image forming apparatus 30 and the user terminal 20 based on the beacon signal (ACT 202). The second controller 429 determines whether or not a value of the estimated distance is smaller than the threshold value (ACT 203). If the value of the estimated distance is smaller than the threshold value (Yes in ACT 203), the second controller 429 determines whether or not the user terminal 20 moves out of the communication range (ACT 204). For example, if the beacon signal cannot be received from the user terminal 20, the second controller 429 determines that the user terminal 20 moves out of the communication range. On the other hand, if the beacon signal is received from the user terminal 20, the second controller 429 determines that the user terminal 20 does not move out of the communication range.

If the user terminal 20 does not move out of the communication range (No in ACT 204), the second controller 429 receives the user information transmitted from the user terminal 20 (ACT 205). Then, the second controller 429 stores the received user information (ACT 206).

If the user terminal 20 moves out of the communication range (Yes in ACT 204), the second controller 429 deletes the stored user information (ACT 207).

In ACT 203, if the value of the distance exceeds the threshold value (No in ACT 203), the second controller 429 determines whether or not the user terminal 20 moves out of the communication range (ACT 208). If the user terminal 20 does not move out of the communication range (No in ACT 208), the second controller 429 repeatedly executes the processes subsequent to the process in ACT 202.

If the user terminal 20 moves out of the communication range (Yes in ACT 208), the second controller 429 deletes the stored user information (ACT 207).

Figure 8:
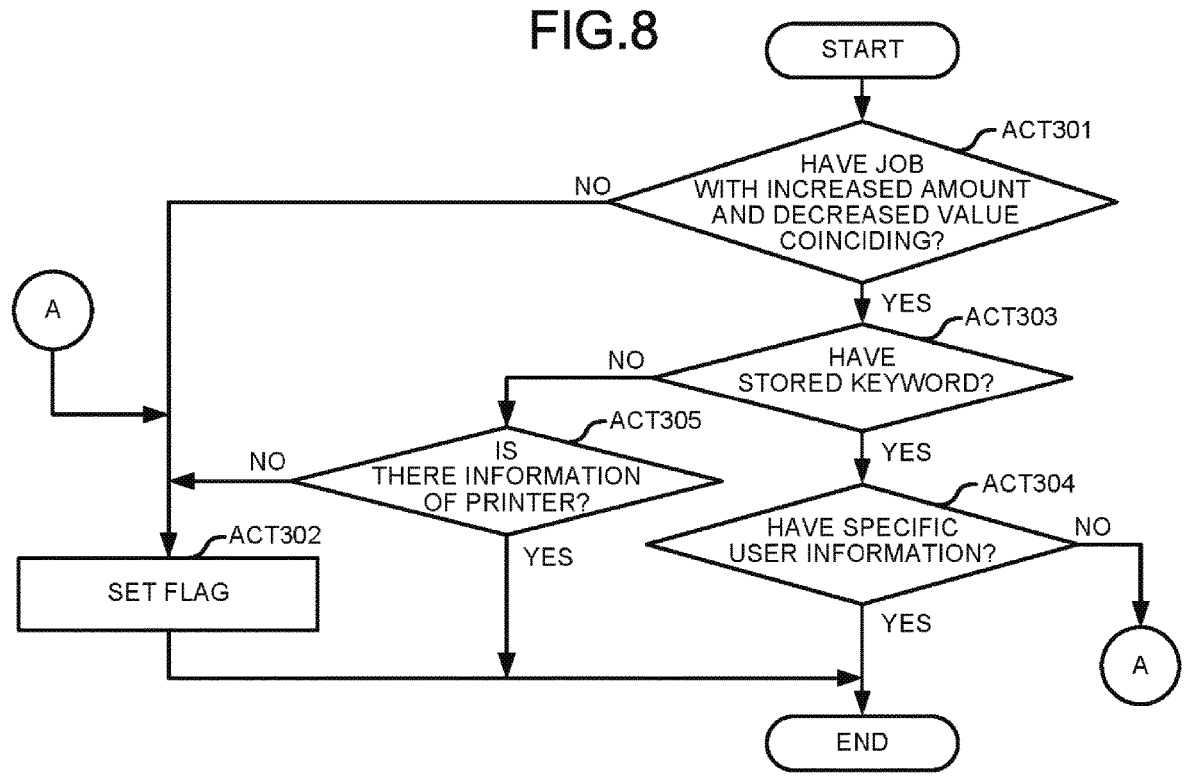
FIG. 8 is a flowchart for depicting a flow of a taking away determination process.

FIG. 8 is a flowchart for depicting a flow of the taking away determination process.

The first controller 428 determines whether or not there is a job in which the increased value and the decreased value coincide with each other (ACT 301). Specifically, first, the first controller 428 reads out the job data table from the auxiliary storage device 36. Next, the first controller 428 refers to the values registered in the items of the weight information in the read job data table. Then, the first controller 428 determines whether or not there is a job in which the increased value and the decreased value coincide with each other. If there is no job in which the increased value and the decreased value coincide with each other (No in ACT 301), the first controller 428 sets the flag (ACT 302). Specifically, the first controller 428 changes the flag to "1" when the value of the flag is "0", and maintains "1" for the flag when the value of the flag is "1". Thereafter, the first controller 428 terminates the taking away determination process.

If there is a job in which the increased value and the decreased value coincide with each other (Yes in ACT 301), the first controller 428 determines whether or not the keyword is stored (ACT 303). Specifically, the first controller 428 determines whether or not the keyword is stored in the record of the job in which the increased value and the decreased value coincide with each other. If the keyword is stored (Yes in ACT 303), the first controller 428 determines whether or not there is specific user information (ACT 304). Here, the specific user information indicates the user information associated with the keyword. If there is the specific user information (Yes in ACT 304), the first controller 428 terminates the taking away determination process.

On the other hand, if there is no specific user information (No in ACT 304), the first controller 428 sets the flag (ACT 302).

If no keyword is stored in ACT 303 (No in ACT 303), the first controller 428 determines whether or not the user information of the user who performs the printing is registered. If the user information of the user who performs the printing is registered (Yes in ACT 305), the first controller 428 terminates the taking away determination process.

On the other hand, if the user information of the user who performs the printing is registered (No in ACT 305), the first controller 428 sets the flag (ACT 302).

The image forming apparatus 30 configured as described above has the weight sensor 40, the beacon device 38, and the controller 425. The weight sensor 40 detects the sheet discharged to the discharge port. The beacon device 38 detects the user terminal 20 positioned within the communication enabled range of the beacon device 38. The controller 425 determines that the sheet is taken away if the user terminal 20 is detected by the beacon device 38 and the quantity of sheets is less than that before detection of the sheet after the sheet is detected by the weight sensor 40. As a result, it is possible to determine whether or not the discharged sheet is taken away.

For example, by associating the printing execution with the result indicating whether the sheet is taken away, it is possible to manage the neglected state which is likely to occur by the user, such as a state in which a user A leaves the sheet behind, or a state in which a user B takes away a smaller quantity of sheets compared with the weight of the discharge sheets estimated by the printing execution (in many cases, leaves a part of the whole sheets behind).

Second Embodiment

In the second embodiment, a part of the processes that the image forming apparatus performs in the first embodiment is performed by another system.

Figure 9:
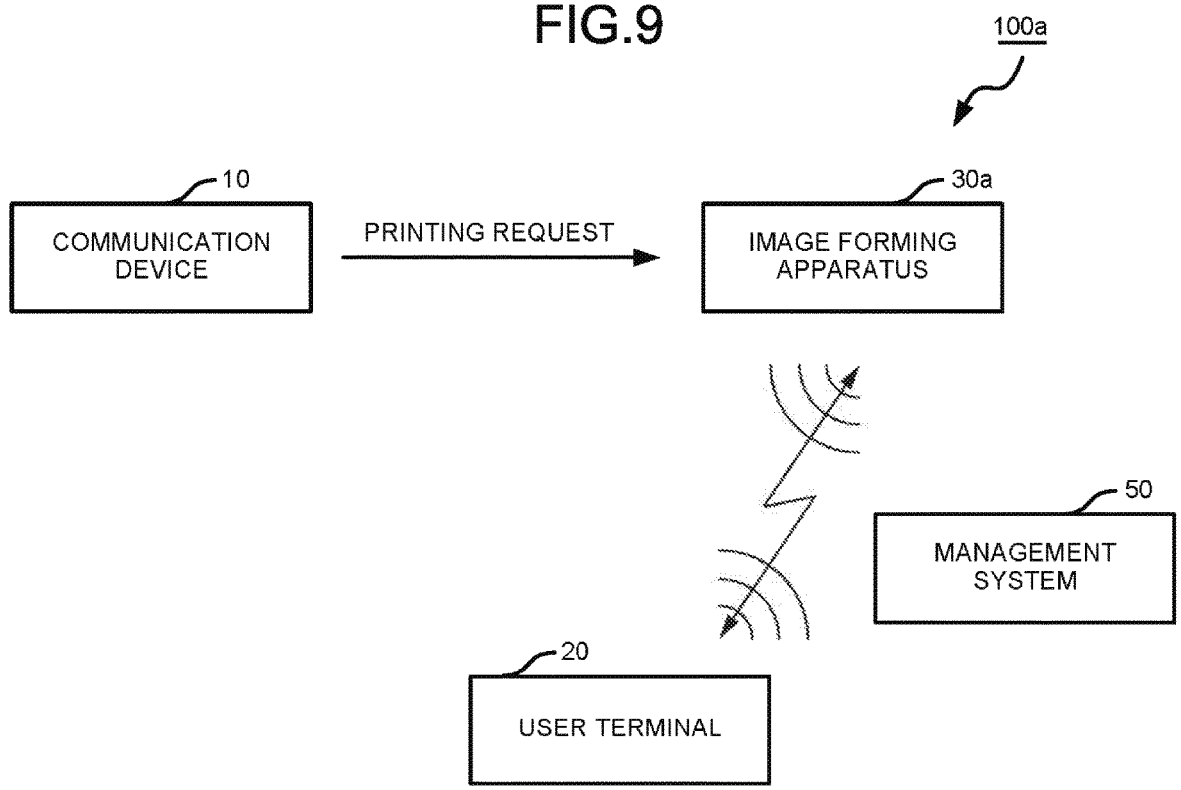
FIG. 9 is a diagram illustrating a system configuration of a neglect prevention system according to a second embodiment.

FIG. 9 is a diagram illustrating a system configuration of a neglect prevention system 100a according to the second embodiment. The neglect prevention system 100a comprises the communication device 10, the user terminal 20, an image forming apparatus 30a, and a management system 50. In the neglect prevention system 100a, the communication device 10 and the user terminal 20 are the same as those in the first embodiment, and the description thereof is omitted.

The image forming apparatus 30a is a multi-function peripheral. The image forming apparatus 30a executes an image forming process. The image forming apparatus 30a transmits the weight information of the sheet detected by the weight sensor and the beacon signal received by the beacon device to the management system 50.

Based on the information transmitted from the image forming apparatus 30a, the management system 50 determines whether the sheet is discharged and whether the sheet is taken away.

Figure 10:
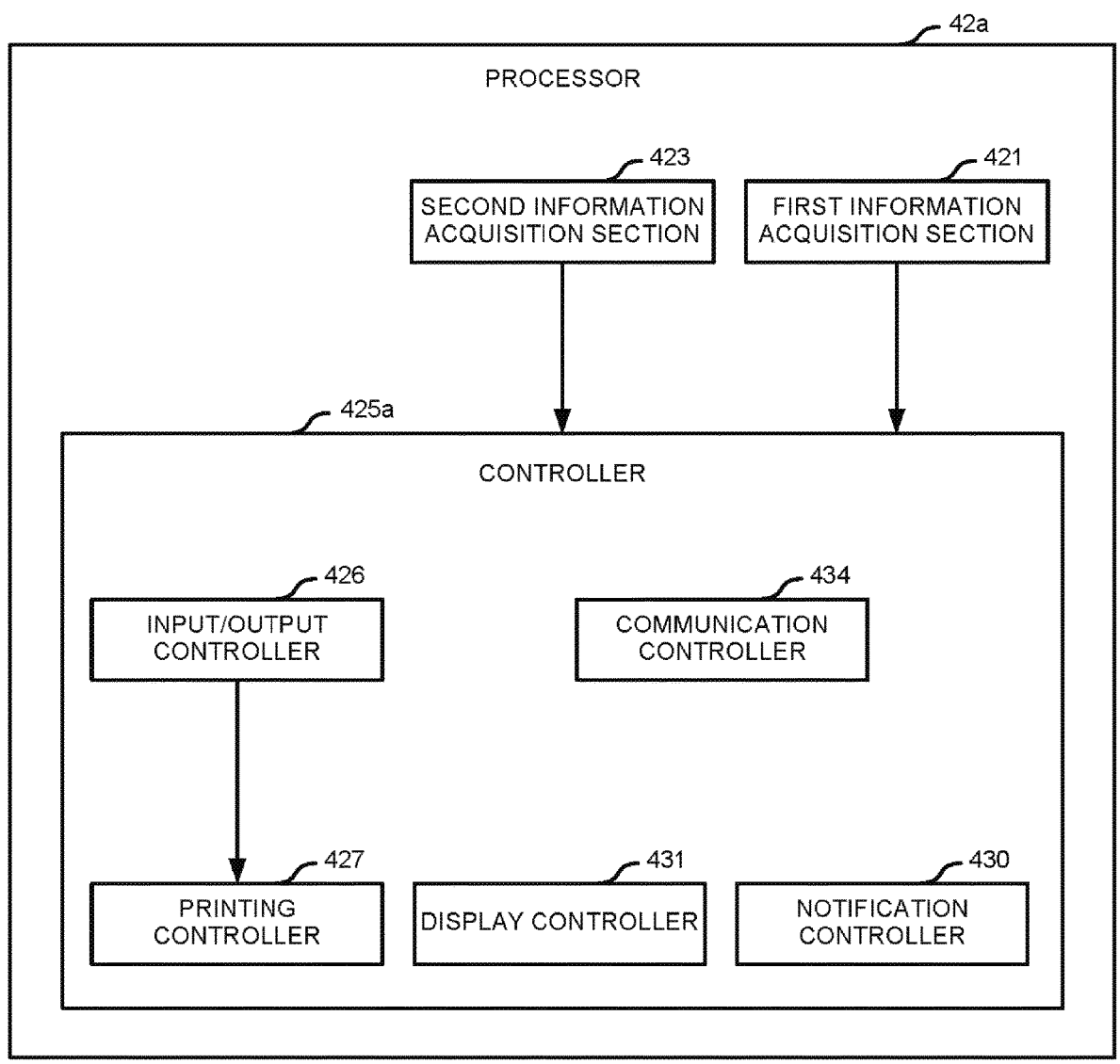
FIG. 10 is a schematic block diagram illustrating functional component of a processor according to the second embodiment.

FIG. 10 is a schematic block diagram illustrating functional components of a processor 42a according to the second embodiment. The processor 42a comprises a first information acquisition section 421, a second information acquisition section 423 and a controller 425a. The first information acquisition section 421 and the second information acquisition section 423 perform the same processes as the functional sections having the same names in the first embodiment, and thus the description thereof is omitted.

The controller 425a comprises an input/output controller 426, a printing controller 427, a notification controller 430, a display controller 431, and a communication controller 434. The input/output controller 426, the printing controller 427, the notification controller 430, and the display controller 431 perform the same processes as the functional sections having the same names in the first embodiment, and thus the description thereof is omitted.

The communication controller 434 controls the communication with the management system 50. For example, the communication controller 434 sends the weight information and the beacon signal received by the beacon device to the management system 50 via the network interface 37.

FIG. 11 is a schematic block diagram illustrating functional components of the management system 50. The management system 50 includes a communication section 501, an information storage section 502, a first information acquisition section 503, a first detection section 504, a second information acquisition section 505, a second detection section 506, a controller 507, and a display section 512.

The communication section 501 receives the weight information and the beacon signal transmitted from the image forming apparatus 30a.

The information storage section 502 stores the weight information and the beacon signal received by the communication section 501. The information storage section 502 is a storage device such as a magnetic hard disk device or a semiconductor storage device.

The first information acquisition section 503 acquires the weight information stored in the information storage section 502.

The first detection section 504 detects the presence or absence of the sheet based on the weight information acquired by the first information acquisition section 503.

The second information acquisition section 505 acquires the beacon signal stored in the information storage section 502.

The second detection section 506 detects the user terminal based on the beacon signal acquired by the second information acquisition section 505.

The controller 507 includes a first controller 508, a second controller 509, a notification controller 510, and a display controller 511.

The first controller 508 performs the taking away determination process based on the detection result of the first detection section 504.

The second controller 509 executes the user detection determination process based on the detection result of the second detection section 506.

The notification controller 510 notifies the authorized user and the administrator of the abnormality when the sheet is neglected or the sheet is improperly taken away. The notification is performed by a method of blinking a lamp provided on the image forming apparatus 30a, displaying a message, issuing beep sound, and the like. The notification may also be performed by a method of blinking a lamp provided on the management system 50, displaying a message, issuing beep sound, and the like.

The display controller 511 controls the display of the display section 512. For example, the display controller 511 controls the display of the control panel 32 in response to the control of the controller 507 to display a message.

The display section 512 is a display device such as a liquid crystal display and an organic EL display. The display section 512 displays various information relating to the management system 50 under the control of the display controller 511.

Hereinafter, modifications of the neglect prevention system 100 and the neglect prevention system 100a are described.

The auxiliary storage device 36 may store a condition table in which the identification information of a user who does not take the sheet away yet after elapse of an upper limit time from the printing execution to the taking away of the sheet is associated with a printing condition imposed on the user. FIG. 12 is a diagram illustrating a concrete example of the condition table. In the condition table, conditions at the time of printing are registered in association with the user information. A value of the condition at the time of printing indicates a printing condition imposed on the user. For example, as a concrete example of the condition at the time of printing, printing name on a part of the printed sheet when executing the printing next time, restricting the number of printed sheets, or the like may be exemplified. The condition at the time of printing is not limited thereto, and any condition may be used as long as it is a condition for promoting the user not to neglect the sheet. With such a configuration, if the printing execution instruction is issued from the user, the printing controller 427 refers to the condition table to perform the printing according to conditions indicated by the condition at the time of printing.

A case in which the sheet is not taken away after the preset upper limit elapses from the printing execution until the sheet is taken away is defined as neglect. For example, when 10 minutes are set as the upper limit, if the sheet is not taken away after 15 minutes elapse, the administrator regards the sheet as the neglected sheet and discards it, thereby ensuring security. By setting the upper limit time for each user instead of uniformly setting the upper limit time, it is possible to deal with individual difference occurring for each user, such as difference in arrangement of seat. It is possible to issue a warning before the sheet is confirmed as the neglected sheet by a mail or a sound. The warning method may be selected for individual users, such as issuing a sound for a user near the sheet and sending a mail for a user away from the sheet.

Besides the definition for each user, a time zone, occupation type, a job, an arrangement or the like can be considered as points for analysis. For example, if the frequency of occurrence of the neglect is high in the network printing, an upper limit time of the neglect may be reduced for the network printing in addition to the upper limit time set for the user.

In the case of combining the settings of the upper limit time, priority is set in advance and the upper limit time of the neglect is determined according to the priority. For example, in a case in which 10 minutes are set for a user A while the upper limit time for the network printing is 5 minutes, if the priority of the upper limit set for the user is higher than that set for the job, the upper limit time of the neglect is 10 minutes. A method of adopting the shortest time among the set upper limit times is considered in addition to determining the upper limit time according to the priority.

If an instruction to turn off the power supply after detecting the neglect of the sheet on the discharge port 39, the controller 425 may determine that a closing process is performed despite the existence of the neglected sheet, and display a message indicating the execution of the closing process on the display section of the control panel 32 or the management system 50.

By storing the weight information by the weight sensor 40 and the user detection information by the beacon device 38 in chronological order, a posteriori survey is facilitated. For example, it is possible to support presumption such as "taking away by a third person detected by the beacon device 38" or "withdrawal of the neglected sheet due to factors that cannot be detected by the beacon device 38 (e.g., by administrator or due to a natural disaster such as wind).

The beacon device 38 and the weight sensor 40 may be IoT (Internet of Things) devices that can communicate with an external management system by themselves. With such a configuration, the processes can be executed even when the power supply of the image forming apparatus 30 is turned off. Specifically, the beacon device 38 and the weight sensor 40 transmit the detection results to the external management system. The management system 50 executes the user detection determination process and the taking away determination process based on the detection results transmitted from the beacon device 38 and the weight sensor 40.

In the above embodiments, the weight sensor 40 is described as an example of a device for detecting the presence or absence of the sheet on the discharge port 39, but the device for detecting the presence or absence of the sheet is not limited thereto. For example, a device for detecting the presence or absence of the sheet may be an infrared sensor or a camera. If the device for detecting the presence or absence of the sheet is a camera, the first detection section 422 detects that there is a sheet if the sheet is photographed in an image captured by the camera. On the other hand, the first detection section 422 detects that there is no sheet if no sheet is photographed in the image captured by the camera.

According to at least one embodiment described above, the weight sensor 40, the beacon device 38 and the controller 425 are provided. The weight sensor 40 detects the sheet discharged to the discharge port. The beacon device 38 detects the user terminal 20 located within the communication enabled range of the beacon device 38. The controller 425 determines that the sheet is taken away when the user terminal 20 is detected by the beacon device 38 and the quantity of sheets after the sheet is detected by the weight sensor 40 is less than that of the sheets before detection of the sheet. As a result, it is possible to determine whether or not the discharged sheet is taken away.

A part of the functions of the image forming apparatus 30 according to the foregoing embodiments may be realized by a computer. In this case, programs for realizing the functions are recorded in a computer-readable recording medium. The programs recorded in the recording medium in which the programs described above are recorded may be read into a computer system to be executed.

Furthermore, it is assumed that the "computer system" described herein contains an operating system or hardware such as peripheral devices. The "computer-readable recording medium" refers to a portable medium or a storage device. The portable medium is a flexible disc, a magneto-optical disk, a ROM, a CD-ROM (Compact Disc Read-Only Memory) and the like. The storage device is a hard disk built in the computer system. Furthermore, the "computer-readable recording medium" refers to a medium for dynamically holding the programs for a short time like a communication wire in a case in which the programs are sent via a communication line. The communication line is a network such as the Internet or a telephone line. The "computer-readable recording medium" may be a volatile memory in the computer system serving as a server and a client. The volatile memory is a medium for holding the programs for a certain time. The foregoing programs may realize a part of the above-mentioned functions. Further, the foregoing programs may realize the function described above by the combination with the programs already recorded in the computer system.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A sheet removal determination system, comprising:
a first detection device configured to detect a sheet discharged to a discharge port;
a second detection device configured to detect a terminal device positioned within a communication enabled range of the second detection device; and
a controller configured to identify a user based on user information acquired from the terminal device detected by the second detection device, determine that the sheet has been removed by the user if, before detection of the terminal device by the second detection device, a first quantity of sheets being detected by the first detection device is less than a second quantity of sheets detected by the first detection device.

2. The sheet removal determination system according to claim 1, further comprising:
a timer configured to measure time from a time point at which the sheet is discharged to the discharge port and the sheet is detected by the first detection device, wherein
the controller notifies neglect of the sheet if a measured time by the timer exceeds a preset set time when a quantity of sheets does not change compared with that before the sheet is detected.

3. The sheet removal determination system according to claim 1, further comprising:
a communication section configured to receive a keyword used for authentication of a user from another device together with a job including a printing request, wherein
the controller determines that the user is an authorized user if the user information is specific user information representing the user information associated with the keyword received by the communication section.

4. The sheet removal determination system according to claim 1, wherein
the controller sets a flag indicating that the sheet is improperly removed when a condition indicating that the sheet is improperly removed is satisfied, and if there is the flag, determines that the sheet is improperly removed and outputs the determination result.

5. The sheet removal determination system according to claim 1, wherein the user is a first user, and further comprising:
a communication section configured to receive a keyword used for authentication of a second user from another device together with a job including a printing request,
wherein a memory is configured to store received keywords,
wherein
the controller determines that the second user is an authorized user if the keyword is stored with the received keywords and the user information is a specific user information representing the user information associated with the received keywords, determines that a condition that indicates that the sheet was improperly removed is satisfied if the user information is not the specific user information indicative of the user information associated with the received keywords, the controller determines that the condition indicating that the sheet is improperly removed is satisfied if the received keywords are not stored and the user information was not registered.

6. The sheet removal determination system according to claim 1, wherein
the controller outputs a message indicating that the sheet is neglected if an instruction to turn off the power supply is issued in a state in which the sheet is detected by the first detection device.

7. The sheet removal determination system according to claim 1, further comprising:
a storage section configured to store identification information of a user that does not remove the sheet after elapse of an upper limit time from printing execution to the removal of the sheet in association with a printing condition imposed on the user.

8. The sheet removal determination system according to claim 7, wherein
the controller performs printing according to the condition indicated by the printing condition if a printing execution instruction is issued from the user stored in the storage section.

9. The sheet removal determination system according to claim 1, wherein
the first detection device is a weight sensor that detects the weight of the sheet discharged to the discharge port.

10. A sheet removal determination method, comprising:
detecting a sheet discharged to a discharge port;
detecting a terminal device positioned within a communication enabled range;
identifying a user based on user information acquired from the terminal device; and
determining that the sheet has been removed by the user if, before detecting the terminal device, a first quantity of sheets is less than a second quantity of sheets as detected at the discharge port.

11. The sheet removal determination method according to claim 10, further comprising:
measuring time from a time point at which the sheet is discharged to the discharge port and the sheet is detected; and
notifying neglect of the sheet if a measured time exceeds a preset set time when a quantity of sheets does not change compared with that before the sheet is detected.

12. The sheet removal determination method according to claim 10, further comprising:
receiving a keyword used for authentication of a user from another device together with a job including a printing request; and
determining that the user is an authorized user if the user information is a specific user information representing the user information associated with the keyword.

13. The sheet removal determination method according to claim 10, further comprising:
setting a flag indicating that the sheet is improperly removed when a condition indicating that the sheet is improperly removed is satisfied, and determining that the sheet is improperly removed and outputting the determination result.

14. The sheet removal determination method according to claim 10, further comprising:
determining that the condition indicating that the sheet is improperly removed is satisfied if the keyword used for user authentication is not acquired from another device and printing by the authorized user is not performed.

15. The sheet removal determination method according to claim 10, further comprising:
outputting a message indicating that the sheet is neglected if an instruction to turn off the power supply is issued in a state in which the sheet is detected.

16. The sheet removal determination method according to claim 10, further comprising:
storing identification information of a user that does not remove the sheet after elapse of an upper limit time from printing execution to the removal of the sheet in association with a printing condition imposed on the user.

17. The sheet removal determination method according to claim 16, further comprising:
performing printing according to the condition indicated by the printing condition if a printing execution instruction is issued from the user stored.

18. The sheet removal determination method according to claim 10, further comprising:
detecting a weight of the sheet discharged to the discharge port.

19. An image forming apparatus, comprising:
an image forming section; and
a sheet removal determination system, comprising:
a first detection device configured to detect a sheet discharged to a discharge port;
a second detection device configured to detect a terminal device positioned within a communication enabled range of the second detection device; and
a controller configured to identify a user based on user information acquired from the terminal device detected by the second detection device, determine that the sheet has been removed by the user if, before detection of the terminal device by the second detection device, a first quantity of sheets detected by the first detection device is less than a second quantity of sheets detected by the first detection device.

20. The image forming apparatus according to claim 19, further comprising:
a timer configured to measure time from a time point at which the sheet is discharged to the discharge port and the sheet is detected by the first detection device, wherein
the controller notifies neglect of the sheet if a measured time by the timer exceeds a preset set time when a quantity of sheets does not change compared with that before the sheet is detected.

* * * * *